March 11, 1969 E. G. PERRY, JR 3,432,646

RETINA CHARACTER READER

Filed June 25, 1964 Sheet 1 of 6

INVENTOR.
EDWARD G. PERRY, JR.
BY D. Carl Richards

INVENTOR.
EDWARD G. PERRY, JR.
BY D. Carl Richards

INVENTOR
EDWARD G. PERRY, JR.
BY D. Carl Richards

INVENTOR.
EDWARD G. PERRY, JR.
BY D. Carl Richards

INVENTOR.
EDWARD G. PERRY, JR.
BY D. Carl Richards

United States Patent Office 3,432,646
Patented Mar. 11, 1969

3,432,646
RETINA CHARACTER READER

Edward Gordon Perry, Jr., Dallas, Tex., assignor to Recognition Equipment Incorporated, Dallas, Tex., a corporation of Delaware Filed June 25, 1964, Ser. No. 377,991
U.S. Cl. 235—61.11 9 Claims
Int. Cl. G06k 7/00

ABSTRACT OF THE DISCLOSURE

An automatic document reader wherein the document is loaded on a spinning cylindrical drum which, when at the optical reading station, advances past a reference location along a path parallel to its axis. An optical viewer advances with the drum and upon completion of the scanning of a line, moves in a direction opposite the advance of the drum in a stepwise motion so as to scan the next succeeding line.

This invention relates to automatic character reading of printed documents and more particularly to the operation of a plurality of drums for a scanning system for tracking and interpreting written documents.

The quest for realization of an operative optical character recognition system has been widespread and has been the object of extensive development work. The present invention relates to a system in which an electronic retina is employed to simulate the natural retina of the eye and in which the retina scans legends or printed information on documents for reliable reproduction and storage of the information.

The present invention is particularly related to the handling of documents for scanning by a retina-type optical-mechanical reader. In a further aspect, the invention relates to the control of documents and scanning elements as to accommodate high-speed reading operations. The invention is further related to the minimization of reading time wherein response is dependent upon document content.

In a more specific aspect, the invention relates to the control of a document-carrying drum and a scanning element in which the scanning element and the document drum are moved cooperatively for registration of the element with each successive line on the document with relative movement of document and viewer being dependent upon document content.

In a more specific aspect, a written document is preferably supported in cylindrical configuration to be rotatable at high speed in the direction of line length. The spinning document is advanced past a reference location. The viewer is moved stepwise in variable amounts in dependence upon spaces between lines on the document. In a preferred embodiment the viewer is advanced with the document and the rate of advance of the document is made dependent upon displacement of the viewer from the reference location.

For a more complete understanding of the present invention and for further objects and advantages thereof, reference may now be had to the following description taken in conjunction with the accompanying drawings in which.

Figure 9:
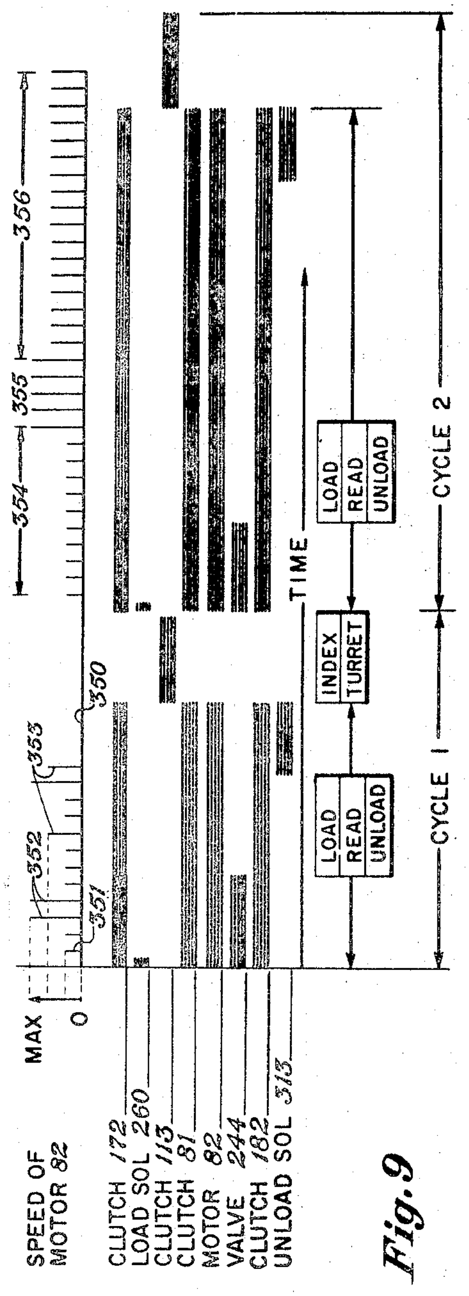
Figure 3:
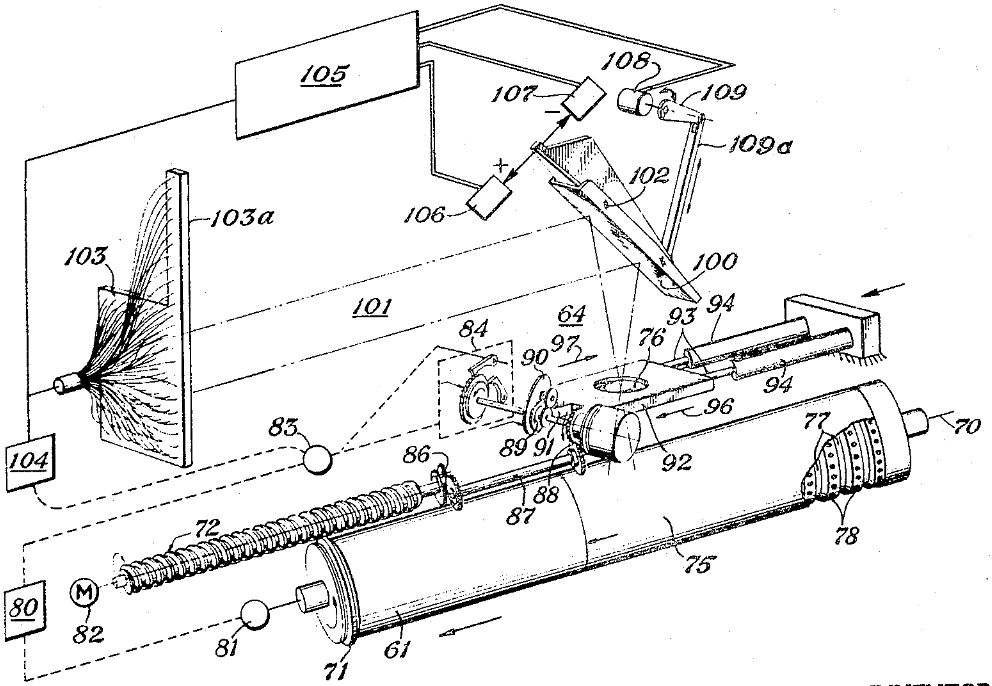
FIGURE 3 is an isometric view illustrating the scanning operation of a drum at the read station.
Figures 4A, 6, 7:
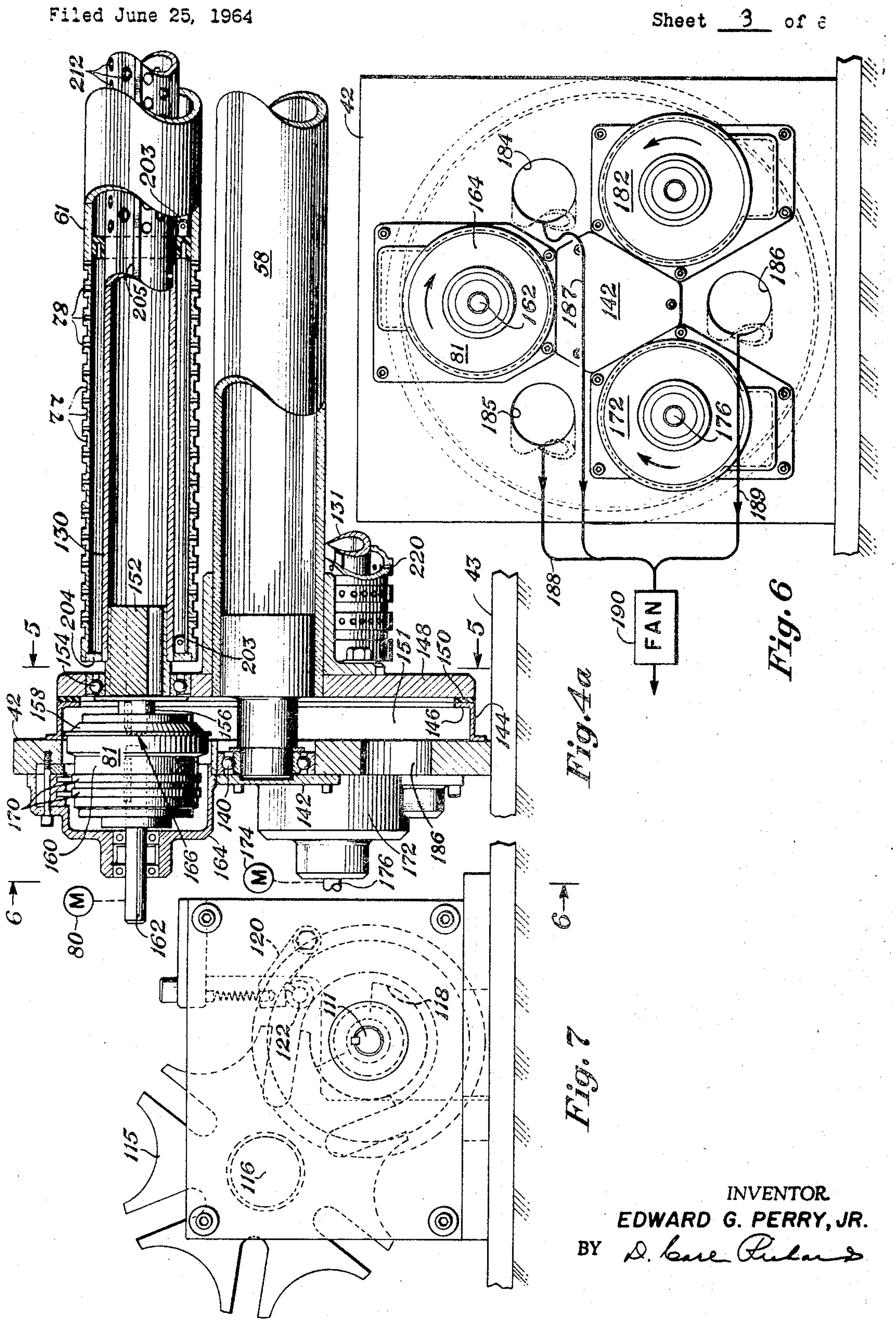
Figures 4B, 5:
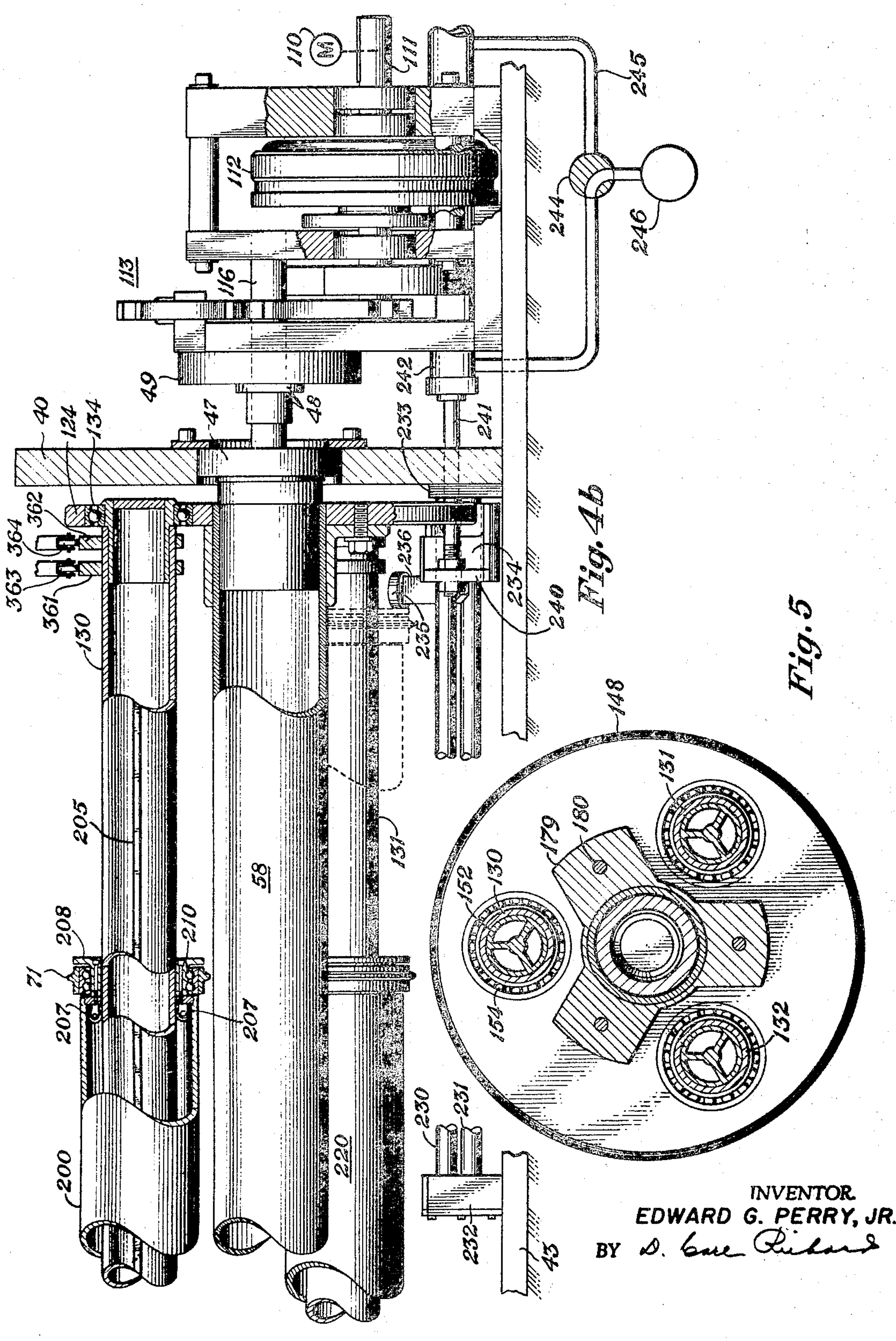
Figure 8:
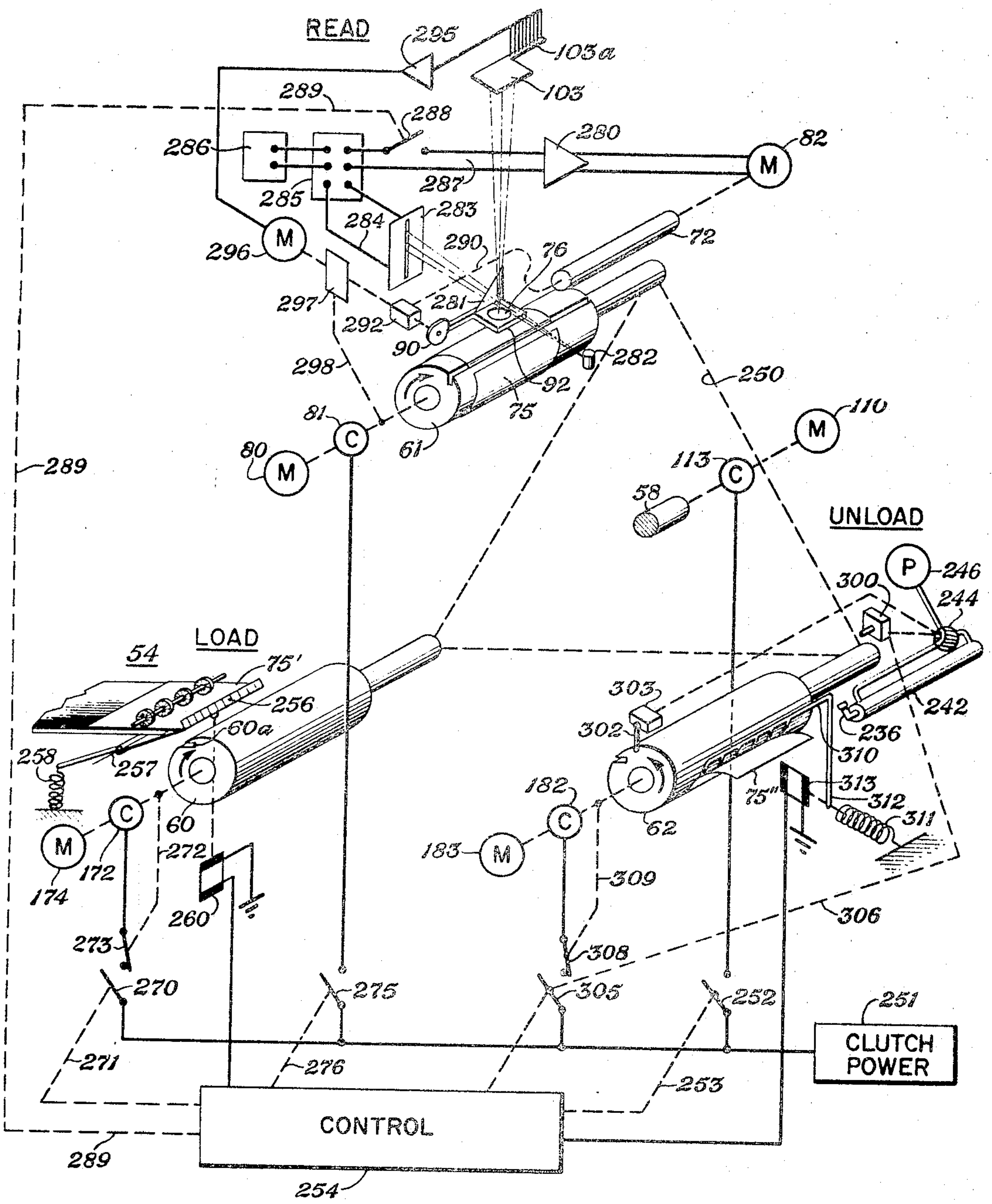
Figure 10:
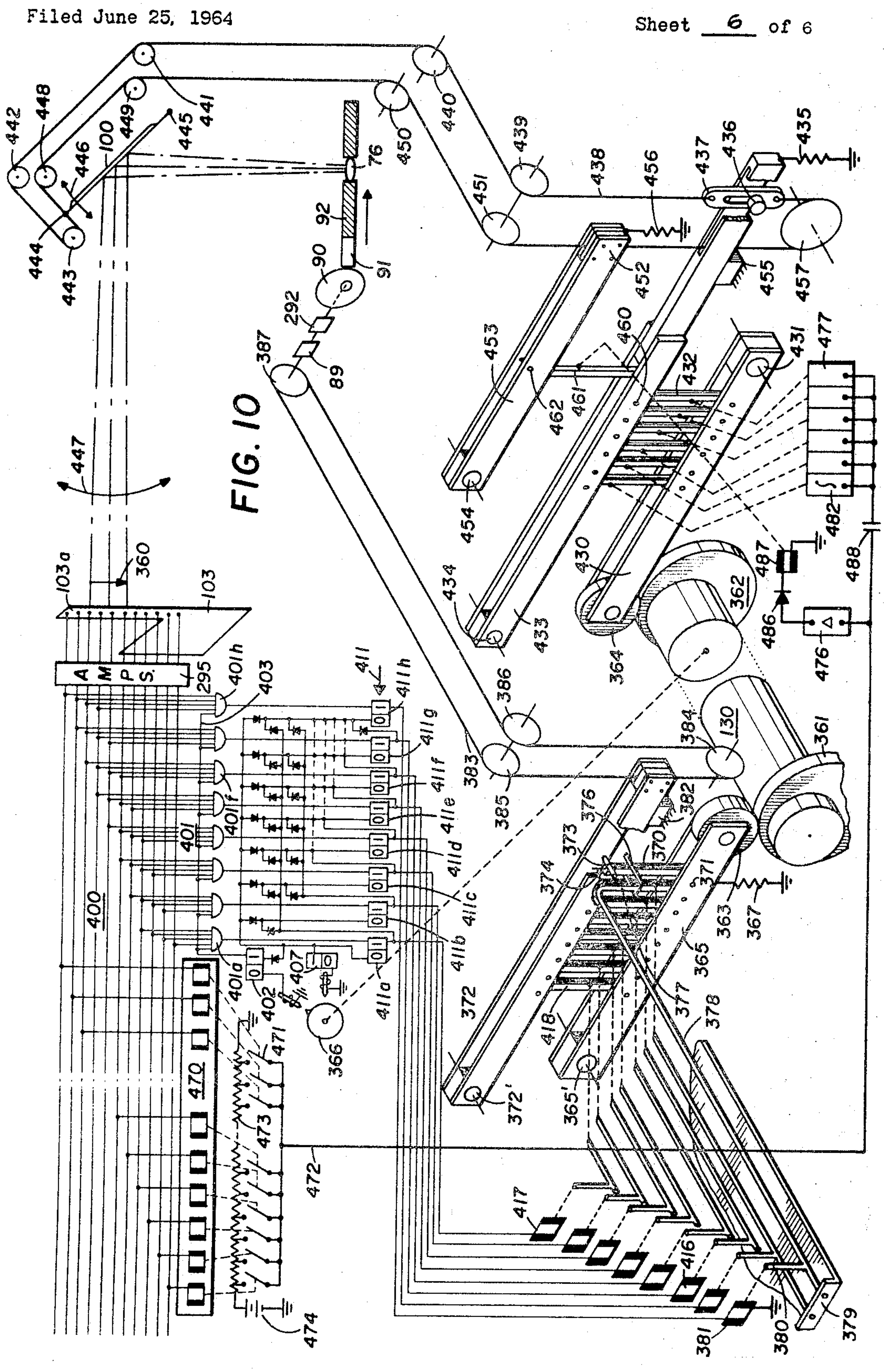

FIGURE 4*a* is a side view partially in section of a portion of the drum system;

FIGURE 4*b* is a side view partially in section of the remaining portion of the drum system;

FIGURE 5 is a sectional view taken along line 5—5 of FIGURE 4*a*;

FIGURE 6 is a view taken along the line 6—6 of FIGURE 4*a*;

FIGURE 7 is an end view of the drive mechanism of FIGURE 4*b*;

FIGURE 8 is a diagram illustrating the control system;

FIGURE 9 is a time plot of two read cycles illustrating selected control functions; and FIGURE 10 illustrates one means for control of the lens holder and the mirror of FIGURE 3.

Figure 1:
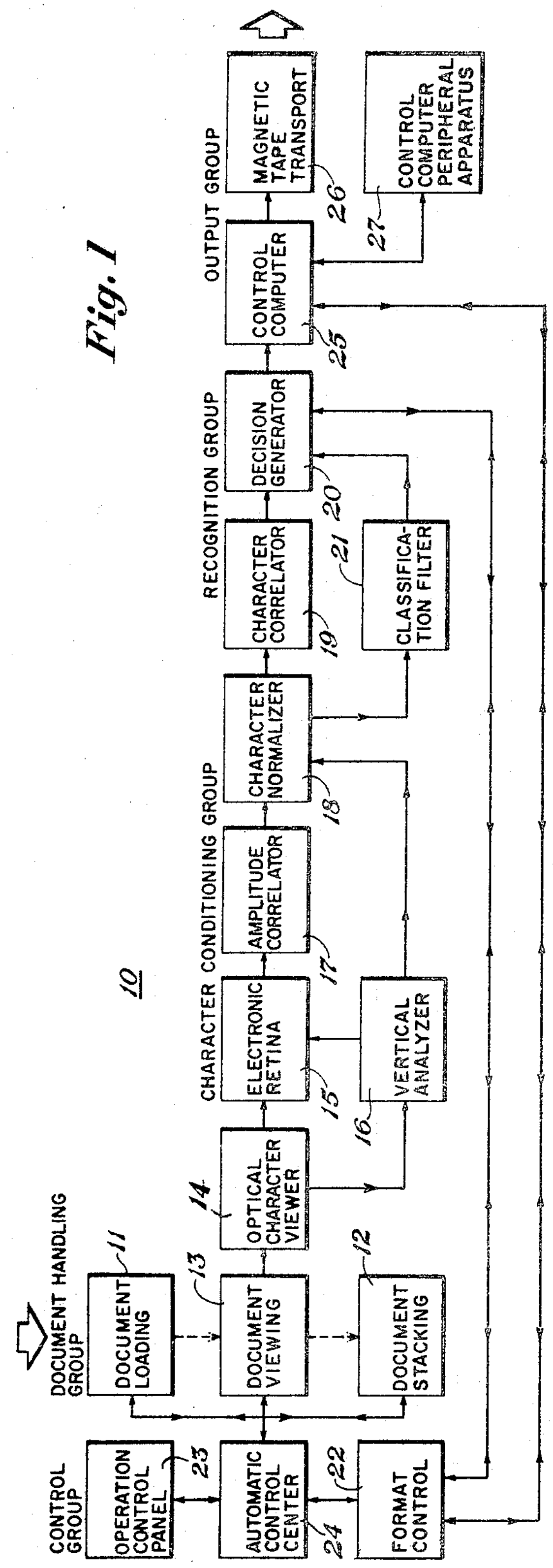
FIGURE 1 is a block diagram of the character reader system of the present invention.

FIGURE 1 illustrates the principal elements of an electronic retina character reader. A loader at a document loading station 11 transports documents one at a time from a supply stack to a document viewing station 13. The documents at the document viewing station are ultimately unloaded at a document stacking station 12. The documents at the reading station 13 are scanned line-by-line by an optical character viewer 14. The optical character viewer 14 transmits an optical image of the data on the document at the station 13 to an electronic multi-cell retina 15. Operating in conjunction with the retina 15 is a vertical analyzer 16 which operates to compensate for misalignment or skew of the documents at the viewing station 13.

Electrical signals produced by the retina 15 are then transmitted to an amplitude correlator 17 which in turn feeds a character normalizer 18. The output of the character normalizer is fed to a character correlator 19 and to a classification filter 21. Both the correlator 19 and the filter 21 feed a decision generator 20 whose output is fed to a control computer 25 in an output group. The computer 25 applies signals representative of the data on the document at the viewing station 13 to a magnetic tape storage recorder 26 and to any additional peripheral apparatus such as represented at station 27. It will be noted that both the decision generator 20 and the control computer 25 are coupled to a format control unit 22 to accommodate the system to variations in the classes or group of characters which may be present on the document at the reading station 13. An operation control unit 23 is provided for an automatic control center unit 24 which operates in conjunction with the format control unit 22.

Figure 2:
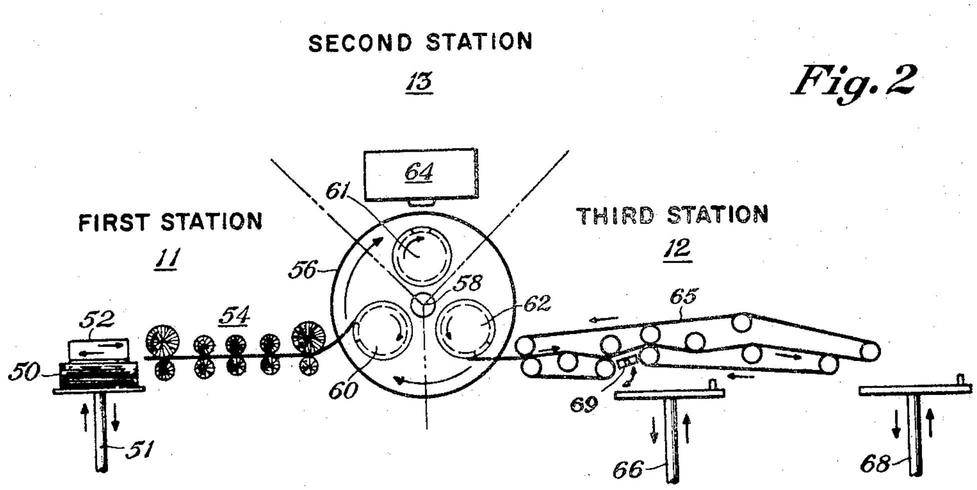
FIGURE 2 is a functional diagram of the document handling and scanning components of the system of FIGURE 1.

FIGURE 2 schematically illustrates the sequence of operations in the document handling group of FIGURE 1. A stack of documents 50 is supported on an elevator 51 which serves to maintain the top document in contact with a vacuum feeder 52. In response to a command signal, the top document on the stack 50 is fed to a loading transport unit 54. Documents are delivered upon demand from the transport unit 54 to a scanning system which includes a support 56 for a plurality of document receiving and supporting drums 60, 61, and 62. The support 56 is rotatable about its central axis 58 in 120° steps. Drums 60, 61, and 62 are sequentially positioned at each of three stations. The first station is the loading station where the documents from stack 50 are loaded onto the drum, as on drum 60. The drum 61, at the second station, has a document loaded thereon. The drum 61 is rotated at a relatively high speed on its own axis while the holder 56 is maintained stationary. During this time there is relative translational movement as between the document drum 61 and the optical mechanism 64. Translation is along the axis of the drum 61 so that the document is scanned line-by-line. At the end of the scanning period, the holder 56 is again rotated through 120°. Upon arrival, at the third station, documents on the drum 62 are unloaded and transported by the stacking mechanism 12 onto either of two supporting and receiving elevators 66 and 68 by a suitable belt transport system 65.

As will be described in more detail, each of the drums 60, 61, and 62 has a longitudinal peripheral slot formed in its surface into which the edge of each document is indexed. Each drum is perforated and is connected to a vacuum system so that the documents are clamped onto the surface of the drum by vacuum. The drums are also circumferentially slotted or ribbed in the area to which the documents are applied so that the documents can be stripped by suitable guides entering the slots under the document at the unloading station.

Drum 61 is illustrated in FIGURE 3 together with the translational drive therefor and elements of the optical character viewer. Drum 61, carrying a document 75, is mounted for rotation on shaft 70. The drive mechanism 80, to be mounted adjacent to the holder 56 of FIGURE 2, is coupled to the drive shaft 70 by means of a suitable clutch 81 which is engageable as the drum 61 reaches a position for registration with the optical scanning mechanism 64. A drum lead ring 71 is mounted on the shaft 70 and is coupled to the drum 61. It is rotatable independently of the drum 61, but the coupling to the drum 61 is such that the drum 61 will be translated along shaft 70 by means of the coupling to a lead screw 72. The drum lead screw is a helical screw which engages the drum lead ring 71 so that the drum 61 is moved along shaft 70. As it moves, the surface of document 75 is cyclically scanned by a lens 76.

The document 75 is mounted on drum 61 in the region wherein the drum is circumferentially ribbed. As best seen in the broken-away portion, the drum has grooves 77 formed in the surface thereof. The ribs 78 between the grooves are perforated with rings of small holes extending to the surface of the drum. The document 75 is retained on the surface of the drum by evacuating the interior of the drum. Drum 61, when at the reading station 13, is driven at a relatively high speed as by mechanism 80 coupled by a clutch 81 to the shaft 70. The motor 82 drives the drum lead screw 72 at a variable rate dependent upon the line spacing on each document. The drive mechanism 80 is also coupled by linkage 83 to a stepping ratchet unit 84.

The drum lead screw 72 is coupled by way of a gear train 86 to a shaft 87 which drives a gear train 88 leading to a differential drive 89 from a cam 90. The cam 90 cooperates with a cam follower 91 on a holder 92 for the lens 76 to coordinate the movement of the lens 76 with the rotation and translation of the document 75 on drum 61. Holder 92 is mounted on guides (not shown). Rods 93 operate in spring-loaded cylinders 94. Springs in cylinder 94 provide a resilient bias to force rods 93 against holder 92 to maintain follower 91 in contact with cam 90.

The system thus far described serves to scan document 75 line-by-line. As the drum 61 reaches the scanning station 13, FIGURE 2, it is positioned such that the lens 76 views an upper marginal portion of the document 75. The drive mechanism 80 is then coupled by unit 81 to the drum 61 for rotation of the drum at relatively high speed, of the order of about 1000 r.p.m. The motor 82 is actuated to drive the lead screw 72 whereupon the drum 61 slides past the reading mechanism 64. By operation of the linkage 86–89, the lens 76 moves in the direction of arrow 96 with the drum 61. Thus, both the lens 76 and the drum 61 move relative to a reference location along a line parallel to the axis of shaft 70. At the end of each line, the linkage 83 for stepping control of the lens holder 92 is actuated to operate the stepping ratchet 84 abruptly to shift the lens 76 into a position of registration with the next line preparatory to following the movement of drum 61 to scan the second line on the document 75.

It will now be understood that, so far as disclosed to this point, movement of the lens 76 as a function of time is substantially saw-toothed. The movement in the direction of arrow 96 is the same as the movement of the drum 61. The movement of the lens 76 in the direction of arrow 97 is an abrupt step. However, as will be explained, the length of the step is made dependent upon the spacing between the lines on the document 75 and at the same time, the speed of motor 82 is varied in order to minimize the demand for movement of the lens and drum from line to line.

Documents to be scanned may have lines thereon which are spaced at variable intervals. To accommodate this arrangement, the retina unit 103 is provided with an elongated upper portion 103*a* which serves as a line-finder. As a given line is being read by the retina 103, signals from the line-finder portion 103*a* serve to indicate the spacing between the line being read and the next line on the sheet. The retina is coupled by way of a control unit 104 to the linkage 83 to step the lens holder 92 in dependence upon the spacing between lines in the field of the lens 76. The movement of the drum 61 varies in its travel along shaft 70 in dependence upon the spacing of the text on a given document as it is read, as will hereinafter be explained. A given document may contain a first portion which is a single-spaced typewritten text. This might be followed on the same page by a double or triple-spaced text. The lead screw 72 is driven at a variable but relatively low speed while the single-spaced portion is being scanned. The lead screw speed is then driven at higher speeds for scanning double or triple-spaced text.

The document 75 is illuminated by high intensity lamps (not shown) mounted on the underside of the lens holder 92. The lens system projects an image upward onto a mirror 100. The image is then reflected from the mirror 100 along the image path 101 to the electronic retina 103. The retina is a part of the character conditioning group of FIGURE 1 and serves to actuate the recognition group. The mirror 100 is pivotally mounted and actuated by two different linkages for oscillatory motion about the pivotal axis 102. Retina 103 is positioned in the image path 101 and includes a segment thereof which controls a position-sensing unit 105 to position the image path 101 on the major retina portion by the application of positive or negative torques to the mirror holder by way of a transducer 108, a crank arm 109, and a strut 109*a*. By this means, the image of a given line is centered on the retina 103.

In order to correct for skew in the lines on document 75 as they pass the lens 76, unit 105 also serves to apply adjusting forces, as by way of units 106 and 107 to the mirror holder to position mirror 100 as will later be explained in further detail. If the document 75 or the lines thereon are skewed, motion of the mirror holder may serve to compensate the same.

After the drum has been translated along the axis of shaft 70, completely to scan the text thereon, the drum 61 is then moved to the unloading station 12 of FIGURE 2. At this station, the forward end of the drum lead ring 71 is contacted by a return drive mechanism which slides the drum to the start position at the right-hand end of the shaft 70. At the unload station, stripping bars are inserted into the grooves 77 to strip the document from the drum and deliver it to the stacking mechanism.

Document handling as above described involved three rotatable document-holding drums to permit the processes of drum loading, document reading, and drum unloading to be carried out simultaneously. By use of a plurality of drums, loading and unloading steps do not significantly limit the number of documents that can be read in a given time interval.

To summarize the foregoing description, the apparatus employs three drums, shown in FIGURE 2. The drums are identical, and each is mounted for rotation on separate axles. The three drum axles are in turn mounted to a pair of common end frames which are rotatably mounted to a frame so as to permit rotation of the entire three-drum assembly.

Sheets which bear characters to be read, for example, a stack of letter-size pages, are fed from the stack and transported by opposed pairs of fiber brushes in unit 54 to the loading station. To load a drum, which is positioned at the loading operation, a sheet from the transport system is driven over a guide as to direct the sheet into contact with the drum surface and into an indexing stop or groove.

The outer surface of each drum is provided with a pattern of holes communicating with the interior of the drum. Means are provided for applying a vacuum through each drum axle to the interior of the drum, as will hereinafter be described.

When a given sheet is indexed for loading onto the drum, the drum is slowly rotated while the sheet is fed onto the surface of the drum where it is held firmly in place by the differential in air pressure between the atmosphere and the interior of the drum. This completes the loading of the drum.

The timing of the system is such that the loading is ordinarily accomplished prior to the completion of the reading cycle. The three-drum assembly or turret is rotated about the main axle, bringing the newly loaded drum into the reading position. The newly loaded drum is then brought up to reading speed, and the movement of the drum past the reading head is initiated.

The drum at the read station advances under the scanning head while rotating, until the entire document or any preprogrammed portion thereof has been scanned. During this interval, a drum having the document previously read is positioned at the unloading station. The drum is unloaded (as the other two drums begin their functions of loading and scanning respectively) by slowly rotating the drum at the unload station in a reverse direction. The sheet is stripped from the drum by a set of fingers which project into annular slots provided in the surface of each drum. The fingers are lowered into the slots under the free edge of the widest document the drum will accommodate. The fingers strip the document from the drum and deliver it face down. Thus, documents are stacked in the order in which they are read.

It may be desirable to provide for separation of the output documents into two classes. For example, documents read satisfactorily will be in one stack. Those upon which an unrecognizable character appears will be in another stack. For such purpose, a gate 69, FIGURE 2, may be selectively actuated to divide documents as between stacks on two elevators 66 and 68.

In FIGURES 4*a*, 4*b*, 5, 6, and 7, one embodiment of a three-drum unit employed as above described in a scanning system is illustrated.

Referring first to FIGURES 4*a* and 4*b*, a pair of end plates 40 and 42 are mounted on a base plate 43. A central shaft 58 is supported in bearings in end plates 40 and 42.

At the right-hand end, the shaft 58 extends through bearing 47 and is coupled by way of a pinion 48 to a gear 49 on the input shaft 116 of an indexing system which is driven by a motor 110. A clutch 112 is coupled between motor 110 and a six-point Geneva mechanism 113. The Geneva mechanism drives the shaft 116 to any of six positions. As shown in FIGURE 7, the Geneva mechanism includes a preformed wheel 115 mounted for rotation on shaft 116. The input drive shaft 111 is parallel to and spaced from shaft 116. Shaft 111 carries a wheel 118 having a sector removed with the remaining periphery adapted to fit into the concave arcuate portions of the wheel 115. A latch 120 is provided for stopping and releasing the wheel 118. A pin 122 carried by wheel 118 is adapted to enter the slots in the wheel 115 to rotate the same and to index the next succeeding arcuate section on the surface of the wheel 118. Gears 48 and 49 provide a two-to-one ratio so that each 60° of movement of shaft 116 is translated into 120° of rotation of shaft 58. Thus, shaft 58 is accurately indexed to each of three angular positions.

A disk 124 is mounted on the right-hand end of the shaft 58. Three hollow shafts are mounted in bearings in the disk 124. Two of the three shafts, the shafts 130 and 131 are shown in FIGURES 4*a* and 4*b*. Shaft 130 is mounted in a bearing 134 which is supported by the disk 124 so that the shaft 130 is free to rotate relative to the disk 124. In a similar manner, the shaft 131 is journaled in the disk 124.

At the left end of the unit the disk 42 supports a bearing 140 for shaft 58. An end plate 142 is secured to the disk 42 to form an air-tight seal over the end of the shaft 58. A ring 144 is secured to the inner face of the disk 42. Ring 144 is provided with an inwardly depending flange 146. A circular disk 148 is mounted on shaft 58 and is thus rotatable relative to the ring 144. A sealing ring 150 is mounted on the flange 146 to provide an air seal for a plenum chamber 151 between the inner face of disk 42 and the outer face of the disk 148.

The left end of hollow shafts 130 and 131 have inserts, such as the insert 152 which is supported in a bearing 154 in the disk 148. A shaft 156 extending from the insert 152 supports a clutch member 158. The clutch member 158 in the portion shown in one-half of a clutch 81, the other one-half 160 is mounted on shaft 162. Shaft 162 is supported by bearings, in a housing 164 which is secured to the outer face of the disk 42. The clutch members have mating faces which make contact at plane 166. Thus, the shaft 58 may be rotated carrying the disk 148 with it. The clutch element 158 may be rotated on the axis of shaft 58 toward and away from registration with the clutch element 160. Motor 80 is coupled to shaft 162 to drive the clutch 81. The clutch 81 may be energized for torque transmission therethrough by closure of an electrical circuit which includes the brushes and slip rings 170. Torque is coupled from motor 80 through the clutch 81 to the hollow shaft 130.

In a similar manner, the shaft 131 is mounted in the end plate 148 with a clutch 172 being provided for coupling power thereto. Motor 174 is coupled to shaft 176 to drive the clutch 172.

As best seen in FIGURE 5, the shafts 130, 131, and 132 are mounted on disk 148 in an equilateral array relative to the axis of shaft 58. A flange 179 is provided for coupling the disk 148 to the shaft 58. The flange 179 is coupled to the disk 148 as by bolts 180. The insert 152 is a webbed tube which is secured to the inner surface of the hollow shaft 130. The bearing 154 is shown supporting the insert 152 for rotation of the shaft 130. In a similar manner, the shafts 131 and 132 are supported by disk 148.

In FIGURE 6 the three clutch housings, such as housing 164, are shown uniformly arrayed around the closure plate 142. Separate drives are provided for each of the clutches 81, 172 and 182 so that they can be independently driven both as to speed and direction.

As viewed in FIGURE 6, the clutch 172 is positioned at the load station. The clutch 81 is positioned at the read station. The clutch 182 is positioned at the unload station. The clutch 172 is adapted to drive the shaft coupled thereto in clockwise direction, during the loading operation, at a very low speed so that sheets may be delivered thereto and wrapped around a drum. During the scanning operation, the clutch 81 serves to drive the drum in the top position in a clockwise direction at a relatively high speed. At the unloading station, the clutch 182 reverses the direction of the drum as compared with its movement at the reading station. The document is then unloaded and the drum from which it is unloaded is then ready to be moved to the load station to receive another document.

As best seen in FIGURE 6, three ports 184, 185, and 186 extend through the end plate 42 into the plenum chamber 151 located at the end of the shaft 58. In accordance with the invention, exhaust lines 187, 188, and 189, shown schematically, lead from the ports 184, 185, and 186 respectively and are coupled to an exhaust fan unit 190. The fan applies a suction to the plenum chamber 151 and thus to the interior of the shafts 130, 131, and 132 by reason of communication through the webs in the ends of the shafts.

Each of the three shafts 130, 131, and 132 supports a drum concentrically therewith. More particularly, as shown in FIGURE 4*a*, the drum 61 is mounted as to be slidable along the length of the shaft 130. The drum 61 is shorter in length than the shaft 130. The left end of drum 61 is provided with a plurality of slots 77. Ports 78 are formed at uniformly spaced locations around each rib so that there is communication through the wall of the drum 61 over the zone to be occupied by a document.

Drum 61 is mounted for translational movement along the length of the shaft 130. The drum 61 is supported on rollers, such as the roller 203. Additional rollers are mounted in the drum 61 at the right-hand end thereof, as best shown in FIGURE 4*b* where rollers 207 are mounted on an end member 208.

The end plate 204 at the left end of the drum 61 is provided with a rectangular key way (not shown) extending therethrough parallel to the axis of the drum. The key way accommodates a key 205. Key 205 is a rectangular rib running the length of the shaft 130. By this means, as the shaft 130 rotates, the drum 61 will also rotate. At the same time, drum 61 will be permitted to slide longitudinally of shaft 130. The lead ring 71 is mounted on a bearing unit 210 on the end member 208 to permit the lead ring 71 to rotate independently of drum 61.

The shaft 130 is perforated as by holes 212 so that the vacuum produced in the plenum chamber 151 will cause air to be drawn through the apertures 78 in the rib portion of drum 61. By this means, the atmospheric pressure serves to clamp the sheets onto the surface of the drum.

A second drum 220 is mounted on the shaft 131 and is of construction above described with respect to drum 61. In a similar manner, a third drum is mounted on the third shaft 132 (shown only in FIGURE 5).

It will be noted that the end plate 208 is perpendicular to the shaft 130. The end plate is provided to cooperate with a drum return mechanism. More particularly as shown in FIGURE 4*b*, a pair of guide rods 230 and 231 are mounted at the left end in a standard 232, which in turn is secured to the base plate 43. Adjacent to the end plate 40 is a support 233 in which the opposite ends of the guide rods 230 and 231 are secured. A carriage 234 is mounted on the rods 230 and 231 and supports a roller 235 which is mounted on an arm 236 carried by the carriage 234.

An end plate 240 on the carriage 234 is coupled by a rod 241 to a cylinder 242. The rod 241 is secured to end plate 240 by nuts threaded onto the ends thereof. The rod 241 passes through the end plate 40 and into the cylinder 242. A piston on rod 241 in cylinder 242 is controlled as to position by valve 244 in a pressure line 245 leading from a compressor storage unit 246. As a drum at the top or scan location is moved to the unload station, valve 244 is actuated to propel the carriage 234 along the guide rods 230 and 232. The roller 235 contacts the end plate 208 while the drum is still spinning and propels the drum to the starting end of the array. The drum at the unload station is then stopped and reversed in direction, at a slow speed, while stripping fingers drop into the slots at the edge of the document to strip the document from the drum and deliver it to the appropriate stack at the unloading station. The valve 244 is then reversed, as will hereinafter be explained, to retract the carriage 234.

Further details as to the operations at each of the three stations 11–13 of FIGURE 1 may be understood by referring to the diagrammatic views of FIGURE 8. Where consistent, the same reference characters have been applied in FIGURE 8 as in FIGURES 1–7.

The turret formed by disks 124 and 148 mounted on the indexing shaft 58 which supports the three drums is represented by the triangle 250. The motor 110 drives the turret shaft by way of the Geneva mechanism 113 which may be considered to be an indexing clutch. Clutch 113 is energized from a power source 251 by closure of a switch 252. The switch 252 is controlled by a linkage 253 leading from a control unit 254. Thus, the actuation of the Geneva mechanism 113 will rotate drums 60, 61, and 62 stepwise about the axis of shaft 58.

At the loading station the drum 60 is driven by motor 174 through clutch 172. Sheet 75′ is driven along transport unit 54 toward the drum 60. A control gate 256, a mechanical gate which engages the leading edge of the document 75′, is pivoted on an axis 257. The gate 256 is normally biased closed by a spring 258. A solenoid 260, when energized from conrtol unit 254, draws the restraining plate of gate 256 downward, permittting the document 75′ to travel so that the leading edge enters the slot 60*a* in the surface of drum 60. After the edge of the document 75′ is seated in the end of the slot 60*a* a switch 270 is closed by way of linkage 271 leading from control unit 254. The motor 174 then drives drum 60 through clutch 172. The drum 60 is rotated slowly in a clockwise direction so that the sheet 75′ is wrapped around and drawn onto the drum surface. The control unit 254, the linkage 272 and switch 273 cooperate to position the drum 60 so that the slot 60*a* will be aligned with the travel path of the sheet 75′. The linkage 272 may be in the form of a cam rotatable with the drum 60, with the linkage being enabled from control unit 254 upon the arrival at the loading station of a drum onto which a sheet is to be loaded. In one embodiment of the system, the loading operation required about one and one-half seconds.

At the reading station, the drum 61 is driven by motor 80 by way of clutch 81. Clutch 81 is energized by closure of a switch 275 through linkage 276 leading to control unit 254. The clutch 81 thus is powered from the source 251.

At the reading station, the screw 72 is driven by motor 82. In a preferred mode of operation, the speed of the motor 82 is varied, in dependence upon the demands of the system, to read one line of printed matter on sheet 75 during each revolution of the drum 61. Thus, the speed of the motor 82 is variable. The motor 82 is driven from a servo-amplifier 280 which is linked to or controlled from the lens holder 92. More particularly, the lens holder includes a flag 281 which operates in conjunction with a beam of light from a source 282, and a light-sensitive slit-type detector 283, to provide an output on channel 284 which is representative of the displacement of the lens holder 92 from a given mean position. The flag is wedge-shaped to vary the proportion of the beam from source 282 reaching the detector 283. The signal on channel 284 is applied to a comparison unit 285. A reference signal is applied to unit 285 from a source 286. An error signal then appears on the output channel 287 which is proportional to displacement of the holder 92 from a reference location. The linkage 290 between the lead screw 72 and the differential unit 292 serves to move the holder 92 in the same direction as the drum 61. The linkage 290 corresponds with the linkage 86, 87, and 88 of FIGURE 3. The differential 292 corresponds with unit 89 of FIGURE 3.

If the servo-loop which includes amplifier 280 were made to be extremely tight, then the screw 72 would rotate at very high speed in the short interval between the instant in each cycle marked by passage of the trailing end of one line under lens 76 and the instant the lead end of the next succeeding line comes into registration with the lens 76. If the lines were single-spaced, then the speed of the screw 72 would be adjusted to advance drum 61 the spacing corresponding with single-spaced written material in this short interval. If triple-spaced material were being read, then the speed of the screw 72 would be three times the speed for the single-space operation. In contrast with the high speed adjustment between read intervals, the screw 72 would remain stationary as a line is being read. Then the screw 72 would abruptly speed up to advance the drum 61 one, two or three line widths as required to accommodate single, double, or triple-spaced material. If the spacing were greater than triple-spaced, then the drum would advance at high speed until another line of printed material is brought into the field of the lens 76. The screw 72 would then be adjusted as to speed to accommodate the material subsequently to be read.

Variations in the speed of motor 82 for a tightly coupled servo-system are illustrated in FIGURE 9 by means of pulse-time functions plotted along line 350. Each pulse plotted along line 350 represents a brief interval of time during which motor 82 is energized. The height of each pulse represents the speed of the motor during that interval. The time interval between pulses is the time required to read a given line. The pulses plotted during the first read cycle, FIGURE 9, are representative of the variation in speed of motor 82 to read a text having written material corresponding with the locations of lines 1, 2, 3, 6, 9, 10, 11, 12, 14, 15, 16, 19, and 21.

Pulses 352 represent motor speed three times as fast as pulses 351. The motor 82 would rotate at the speed represented by pulses 352 to move to a line three spaces below the line just read. In cycle 2 of FIGURE 9 a different text spacing calls for a different speed. An initial portion 354 is for single-spaced text. An intermediate portion 355 is for triple-spaced text. A terminal portion 356 is for double-spaced text. It is to be understood that the conditions represented by the motor speed functions of FIGURE 9 represent the assumed condition that the servo-loop for energizing motor 82 is extremely tight.

Because of the relatively short interval of time available for moving the drum, it has been found desirable to operate the servo-loop with an appreciable time constant to reduce somewhat the accelerations in the motor speed and to compensate for such reduction by movement of the lens holder 92.

The amount of movement of the lens holder is controlled by the line-finder 103*a* of the retina 103. The output of the line-finder 103*a* is fed by way of an amplifier 295 to a transducer 296 which serves to control the amount of motion of the lens holder 92. Movement is accomplished by way of a control unit 297 and the differential 292 which drives the cam 90. A linkage 298 extends from the control unit 297 to the shaft of the drum 61 for synchronizing the application of a moving force to the lens holder with the drum position.

The lead screw linkage 290 actuates the cam 90 to cause the lens holder normally to follow the drum 61. The linkage 295–397 serves to introduce step-like motion to the lens holder 92 in direction opposite to the movement of the drum 61. The motor 82 is responsive to an unbalance signal produced by stepping action introduced by the line-finder linkage 295–297 to minimize the movement necessary to reach a line to be read.

If the sheet 75 is one of a stack of sheets of generally identical physical makeup, and it is known that the lines to be read appear at one or more fixed locations on the sheet, then the control unit 254 may be employed to program the start position of the drum to minimize the length of the read cycle.

At the unloading station, the arrival of the drum is sensed by means represented by a microswitch unit 300. Closure of switch unit 300 actuates valve 244. The unit 242 moves the return carriage 236 to slide the drum 62 to the starting end of its shaft. The arrival of the drum at the starting end of its shaft is sensed by means such as a microswitch 302 which actuates a control unit 303 to operate valve 244 for return of the carriage 236 to its home position.

With the arrival of the drum 62 at the unload station, switch 305 is closed, as by way of linkage of 306, to energize clutch 182 from source 251. As drum 62 arrives at the unload station, it is spinning clockwise but is coasting to rest from its high speed at the read station. With the closure of switch 305, the clutch 182, because of slippage, applies a braking force to the drum 62 and then starts the drum 62 slowly to rotate in counterclockwise direction.

A set of stripping fingers or tines are mounted for rotation about the axis of a shaft 310. The shaft 310 is biased by a spring 311 coupled to a crank arm 312 normally to bias the stripping fingers away from the surface of drum 62. However, as the drum starts rotating in counterclockwise direction as above described, solenoid 313 is energized to move the fingers into the grooves on drum surface (illustrated in FIGURE 4*a*) so that the sheet 75″ is slowly stripped from the drum 62 and delivered to a stacking station. When the sheet 75″ is stripped from the drum, switch 308 is opened as by way of linkage 309. The unloaded drum is then indexed to the loading station by actuating clutch 113 if the document reading is then complete.

While the linkage from the line-finder 103*a* to the lens holder 92 has been shown as an electro-mechanical linkage in FIGURE 8, it has been found that a linkage driven from a cam on the shaft of the drum at the reading station provides more positive application of power for stepping the lens holder 92. Such a mechanical embodiment has been illustrated in FIGURE 3. The electro-mechanical counterpart has been included in FIGURE 8 primarily to assist in understanding the rather complex variations with time of the motion of the drum and the lens holder.

If material to be scanned were of uniform spacing on a given sheet, it would then be possible to eliminate any movement from the lens holder by properly indexing each sheet on the drum slightly skewed so that the drum could then be moved at a constant speed and each line would follow a spiral track the pitch of which is equal to the advance per revolution of the drum. Each line would then positionally be in registration with a fixed lens. However, since a reader in general must be more versatile and adaptable to varying requirements, the present invention provides for accommodating written materials of mixed spacing.

In accordance with one aspect of operation of this system, the sheet 75 may be fed onto the drum skewed to a degree corresponding with a double-spaced text. By this means, the amount of adjustment in speed of the drum and the stepping or positional adjustment of the lens holder will be minimized, the adjustment being in one sense for single-spaced material and in the other sense for triple-spaced material.

FIGURE 9 illustrates a sequence of operations. With the drum at the load station at rest, the load solenoid 260 is energized to feed the lead edge of the paper onto the drum. Clutch 172 is energized and a sheet is loaded during one revolution.

Simultaneously with energization of the load solenoid 260 and clutch 172, clutches 81, motor 82, valve 244, and clutch 182 are energized. Clutch 81 and motor 82 initiate and control the operation at the read station. The valve 244 serves to move the drum at the unload station to the opposite end of its shaft. Clutch 182 applies braking and reversing torque to the spinning drum arriving at the unload station. The unload solenoid 313 is energized at or near the end of the read cycle. At the end of the read cycle, the drum clutches 81, 172, and 182 are all de-energized and the turret clutch 112 is energized to index the turret to a new position, following which a new load, read, and unload cycle is repeated.

FIGURE 9 illustrates some of the functions in the system of FIGURE 8 for each of two cycles. At the beginning of each cycle the load solenoid 260 is energized to feed a new sheet onto the drum at the load station. The clutch 81 is energized to rotate the drum at the read station. The motor 82 is energized through its servo-loop to start the lead screw 72 in operation. The valve 244 is actuated to move the drum at the unload station from one end of the turret to the other end thereof. Clutch 182 is energized to brake the drum at the unload station to stop and to reverse the directiton of rotation. After a document is loaded at the load station and the drum is positioned for unloading at the unload station, clutch 172 is de-energized and valve 244 is de-energized. Near the end of the read cycle, the unload solenoid 313 is energized to strip the document from the drum at the unload station. At the end of the read cycle, clutches 81, 172, and 182 are de-energized and motor 82 is de-energized. Thereafter, the clutch 113 is energized to index the turret.

FIGURE 10 illustrates transmission of motion to the lens holder 92 and to the mirror 100. As above noted, the lens holder 92 and the mirror 100 are moved primarily in response to signals from the line-finder 103*a* of the retina 103. The retina 103 preferably will be dimensioned to accommodate an image about twice the height of a given letter in order to accommodate and interpret each successive letter focused thereon through lens 76. The line-finder 103*a* preferably will have a height such that it will intersect the ray paths from a line at least three spaces below the line focused onto the retina 103. Thus when a line is being read by being focused through lens 76 onto the retina 103, the second, third and fourth lines of a single-spaced text will be focused onto the line-finder 103*a*.

For the purpose of the following description, assume that only the image 360 representative of "the next line" of a double-spaced text is directed onto the line-finder 103*a*. The system illustrated in FIGURE 10 provides coarse stepping of the lens holder 92 at the end of the line being read so that, on the next revolution of the read drum, the image 360 will be focused onto the retina 103. The system of FIGURE 10 further provides for varying the position of mirror 100 during the revolution of the drum as required to direct the image 360 onto the retina to the extent necessary to correct for any skew in the line from which the image 360 is derived. The magnitude of the motion of the lens holder 92, the magnitude of the skew correction applied to the mirror 100, and the skew direction are determined and pre-set during the next preceding revolution so that the image is focused onto the line-finder 103*a*.

The power for moving the lens holder 92 is derived from the shaft 130 positioned at the read station as shown in FIGURES 4*a* and 4*b*. A portion of the shaft has been illustrated in FIGURE 10. The shaft 130 drives two cams 361 and 362 and a timing cam 366. Cam 361 provides mechanical power for moving the lens holder 92. Cam 362 provides mechanical power for moving one end of the mirror 100. Cams 361 and 362 are shown in FIGURE 4*b* with cam followers 363 and 364 cooperating therewith respectively.

Cam 363 is mounted at one end of a pivot arm 365. The arm 365 is pivoted on shaft 365′ mounted on the reader frame. The pivot arm 365 is resiliently biased by a spring 367 normally to maintain contact between follower 363 and cam 361. The cam 361 is mounted on shaft 130 and is shaped such that it will provide an abrupt step in the upward travel of pivot arm 365 in the interval between the end of one one line and the start of the next succeeding line.

Pivot arm 365 carries a plurality of transfer struts such as the strut 370. The strut 370 is pivoted in the pivot arm 365 on a shaft 371. It extends upwardly toward a long lever 372. Lever 372 is pivoted on shaft 372′ mounted on the reader frame. The lever 372 has a central slot extending therethrough across which a plurality of shafts such as the shaft 373 extend. Shaft 373 is positioned adjacent the upper end of the transfer strut 370. The strut 370 has a limit pin 374 extending upwardly from the upper end thereof. The upper end of the strut 370 is flat. Normally the strut 370 is resiliently biased in a counter-clockwise direction by a spring (not shown) so that, as the pivot arm 365 moves up and down in response to the cam 361, the strut 370 will pass the shaft 373.

A plurality of similar struts are mounted in the pivot arm 365 along with the strut 370. They are spaced at successively decreasing distances from the pivot shaft 365′ so that the motion of the upper ends of the respective struts is progressively smaller. The motion of the upper ends of the respective struts may be selectively applied to the lever arm 372 by rotation of the strut about its pivotal axis in the pivot arm 365. More particularly, it will be noted that a fork 376 encompasses the strut 370. The fork 376 is coupled to a crank 377 which in turn is coupled to a crank shaft 378. Shaft 378 is pivoted in an upturned flange at the left end of the mounting plate 379. The shaft 378 similarly is to be pivoted at the right-hand end adjacent to the lever 372 in a similar upturned flange (not shown). A lever 380 is coupled to the shaft 378 and is actuated by a solenoid 381. When solenoid 381 is energized, the shaft 378 rotates in a counter-clockwise direction to move the stop 374 into engagement with the shaft 373. Thereupon, as the strut 370 moves upward with the pivot arm 365, the motion is transferred to the lever 372 by the upper end of the strut 370 engaging shaft 373.

The lever 372 is normally resiliently biased downwardly against a stop 382 by a spring (not shown). A cable 383 is clamped in the end of the lever 372 opposite the pivot shaft 372′. The cable 383 extends downwardly over a pulley 384. It passes over pulleys 385, 386 and 387. The pulley 387 is coupled to the cam 90 through the differential ratchet mechanism 89 to apply the motion of the lever 372 through the cam follower 91 to the lens holder 92. It has been found desirable to derive power for the movement of the lens holder 92 from the shaft 130 in view of load involved. The mechanical coupling above illustrated has been found to provide an adequate source of power for moving the lens holder to the degree necessary to shift between lines of single-spaced, double-spaced, or triple-spaced text in the relatively short interval between the end of one line and the beginning of the next line. The amount of movement is proportioned by energizing a selected one of solenoids in the solenoid bank which includes the solenoid 381. A mechanical linkage including a pivoted shaft and a fork extends from each of the solenoids in the bank to each of the transfer struts mounted in the pivot arm 365. Only the shaft 378 has been shown completed to the fork 376. The rest of the linkages are shown dotted in part. However, it is to be understood that they will be identical in construction with the linkage leading to the strut 370.

The control functions for selecting the proper solenoid for each revolution of the read drum are derived from a line-finder bus 400. The bus 400 will include many more channels than illustrated, preferably of the order of about 42–50 channels. However, for the purpose of the present description only, 11 channels have been illustrated with a portion of them actually forming part of the retina array. It will be assumed that the normal height of the image 360 for a given line will span about four of the light cells in the line-finder 103*a*.

The logic for selecting which of the solenoids to energize includes a bank 401 of AND gates and a bank 411 of bi-stable multi-vibrators. The AND gate 401*h* is connected to the top four channels in the bus 400 and is connected to a transfer gate generator 402 actuated by the timing cam 363. The transfer gate generator is connected by way of a bus 403 to one input of each of the AND gates. The AND gates are connected in an ordered pattern to successive groups of four of the channels in the bus 400 with the AND gate 401*a* being connected to the bottom four channels. With the image 360 focused as illustrated in FIGURE 10 only the AND gate 401*f* would be enabled on the application of a transfer pulse on the bus 403.

Each AND gate in bank 401 is connected at its output to an input of a bi-stable multi-vibrator. More particularly, gate 401*a* is connected to multi-vibrator 411*a*, gate 401*h* is connected to the multi-vibrator 411*h*, and gate 401*f* is connected to multi-vibrator 411*f*. Thus as the transfer gate couples the AND gates to the respective multi-vibrators only the multi-vibrator 411*f* would be energized. The multi-vibrator 411*f* serves to energize solenoid 416 to move the third strut on the pivot arm 365 into a transfer position with respect to the lever 372.

It will be noted that the output of multi-vibrator 411*a* is connected back by way of diodes to reset input terminals of each of the other multi-vibrators. Similarly, multi-vibrator 411*b* is connected by way of diodes to a reset terminal of multi-vibrators 411*c*–411*h*. Similar connections are provided from each of units 411*c*–411*g* as indicated by dotted lines in FIGURE 10. By this means if single-spaced text is viewed by the line-finder 103*a*, only the lowermost of the lines focused onto the line-finder will be effective in the selection of the solenoid to be energized.

Any text at the location of the third and fourth lines of a single-spaced document, the first line of which is focused onto the retina, would also impinge the line-finder. However, by reason of the diode couplings between the outputs and the reset input terminals of the multi-vibrators in bank 411, only one of the multi-vibrators will be enabled.

A reset pulse from generator 407 is applied to a reset bus following the start of each revolution of the read drum to reset to zero all of the multi-vibrators 411.

The foregoing is one mode of moving the lens holder 76 at the end of each line in an amount which is dependent upon the demand of the text being read. For single-spaced text, a relatively short step will be introduced. For double-spaced text a step of double magnitude will be introduced. For triple-spaced text a proportionately larger increment will be applied to the lens holder. The motion thus introduced into the lens holder minimizes to a degree the amount of acceleration required of the motor 82, FIGURE 8, to drive the drum at the read station. Thus, part of the motion required to focus the "next line" onto the retina is introduced by movement of the lens holder and part of the motion is introduced by changing the speed of the motor 82.

The provision for skew correction involves a sensing circuit connected to the bus 400 and thence through a lever system to a cable coupled to the upper end of the mirror 100.

The skew cam 362 actuates the cam follower 364. The cam follower 364 is mounted at the end of a pivot arm 430. The arm 430 is pivoted on shaft 431. A plurality of transfer struts such as the strut 432 are mounted in the pivot arm 430 so that motion of proportioned amounts can be transferred from the cam 362.

The motion is transferred to a long lever 433 which is pivoted on shaft 434. The lever 433 is coupled at the right-hand end thereof by a relatively strong spring 435 to the reader frame so that it normally is in contact with a stop 455.

The end of the lever 433 is slotted. A pin 436 extends transversely across the slot. A slotted link 437 is looped over the pin 436. Link 437 is coupled to and forms a part of the transfer linkage which includes the cable 438. The cable 438 passes over pulleys 439, 440, 441, 442, and 443 to a point 444 where it is coupled to the end of the mirror 100. Mirror 100 is pivoted at point 445. Thus, movement is introduced as along an arc represented by the arrow 446 in proportion to movement of the image 360 as along the arc 447. The motion of the mirror 100 as represented by 446 is in sense opposite the motion of the image 360 as produced by skew of a given line.

The cable passes from the end connection 444 over pulleys 448, 449, 450, and 451 to a clamp 452 at the right-hand end of a secondary lever 453. The lever 453 is pivoted on shaft 454 and is normally biased downward by a spring 456. Spring 456 is weaker than spring 435. From the clamp 453, the cable 438 extends downward to pulley 457 and thence to the other end of the slotted link 437.

The action of the spring 456 normally causes the slotted link 437 to ride up against the pin 436. When one of the struts such as the strut 432 is moved into engagement with its transfer pin 460, the lever arm 433 moves upward. Link 437 follows pin 436 upward under the force of the spring 456. Thus, motion in one sense of the mirror 100 is produced as the link 437 follows the pin 436. However, motion of the opposite sense may be required to correct for skew. Such motion is introduced into the mirror 100 by actuating the secondary lever 453.

The lever 453 is coupled to lever 433 by a single transfer strut 461. The strut 460 normally does not engage the secondary lever 453. However, upon energization of a suitable solenoid controlled coupling (of the same nature as the coupling from solenoid 381 to the strut 370) the strut 461 will engage transfer pin 462 to move the secondary lever upwards in synchronism with the movement of the long lever 433. When this is done the mirror 100 is moved in the opposite sense. That is, as the pin 436 moves upward the slotted link 437 moves downward in response to upward movement of the cable 438 at the point of clamp 452.

The selection of the motion of the mirror 100 is made dependent upon the amount and the direction that the position of the image 360 varies over the line-finder 103*a* during each revolution of the read drum. More particularly, the channels in the line-finder bus 400 are coupled to individual solenoids in a bank 470. The solenoids are separately coupled to switches in a multi-switch bank 471. The switches cooperate with a voltage divider to apply a signal to a line 472 which varies in proportion to amount of movement of the image 360 across the line-finder 103*a*. More particularly, a voltage divider 473 is connected at one end to ground and at the other end to a battery 474 which in turn is connected to ground. Closure of any switch in the bank 471 will apply a voltage to the line 472. The line 472 leads to the input of the differentiator 476 and, through condenser 488, to the inputs of integrators 477–482. As the image 360 sweeps across the line-finder 103*a* to any appreciable degree in dependence upon the skew of a given line, the voltage on line 472 will progressively change as the solenoids in the bank 470 are successively energized. The direction of the change will be sensed by the differentiator 476. The output of the differentiator 476 is applied through a polarity sensing unit, such as diode 486 to a solenoid 487 which serves to move strut 461 into engagement with pin 462. If movement of image 360 is in one direction the strut 461 will be moved to engage the pin 462. If the movement of the image 360 is in the opposite direction the diode 486 prevents energization of the solenoid 487. Thus, the sense of the movement of the image 360 is properly selected as to the direction for movement of the cable 438.

The magnitude of the adjustment to be applied to the cable 438 is determined by the integrators 477–482. That is, the magnitude of the change of voltage as appears through the coupling condenser 488 in the line 472 is stored in the integrators 477–482. The integrators are then selectively coupled, as through a linkage such as employed from the AND gates in bank 411, so that one and only one of the struts in the array 432 will be coupled to the lever 433. The strut will be selected such that the movement will be proportional to the magnitude of the sweep of the image 360 across the line-finder 103*a*.

The cam 362 is shaped for linear rise of the cam follower 364 during the interval that each line passes under the lens 76. This is in contrast with the cam 361 which provides for an abrupt step upward of the cam follower 363 at the end of each line.

In one embodiment of the invention, the drum positioned at the read station was driven at a speed of 771 r.p.m. for a peripheral velocity of 200 inches per second for a five-inch drum. Suitable drive power is supplied at the read station by a ¾ horsepower motor operating at 1800 r.p.m. and reduced to 771 r.p.m. by a belt coupling to shaft 162 of clutch 80.

Normal document handling may be at the rate of from about 15 to 30 8½ x 11 inch documents per minute depending upon the text. The torque on the drum shafts, as applied by clutch 80, preferably is positive with no slipping. For this purpose, satisfactory clutch units are of the type manufactured and sold by Simplatrol Products Corporation of Worcester, Mass., and identified as clutch coupling K130. The drum motors 174 and 183 at the load and unload stations may be ¼ horsepower gear motors having an output shaft speed of about 106 r.p.m., stepped up to about 150 r.p.m. by belt couplings to clutches 172 and 182. The motor 82 which drives the lead screw 72 preferably is of a type capable of abruptly accelerating and decelerating in applying a driving torque to the lead screw 72. The motor 82 may be of the type manufactured and sold by Printed Motors, Inc., Glen Cove, N.Y., and identified as printed DC servomotor, Model P.M. 488.

Motor 110 may be a ¾ horsepower gear motor whose output is at about 120 r.p.m. and reduced to a rate of about 25 r.p.m. through the Geneva mechanism 113 for indexing in an interval of about ½ second.

Blower fan 190 preferably is of capacity of about 500 cubic feet per minute at a pressure of about 3 inches of mercury.

The cells in the retina 103 and the line-finder 103*a* may be such at manufactured and sold by Texas Instruments Incorporated of Dallas, Tex., and identified as LS–400 silicon planar photo transistors.

Gates 471 of FIGURE 10 have been illustrated diagramatically as solenoid-operated mechanical switches in order to portray their function. For an analog-type of skew sensing circuit, the gates 471 would actually be high-speed electronic gates such as are well known in the art, as represented by the compensated gate shown and described in U.S. Patent 2,862,104 to Summers. High-speed gates are also described in "Handbook of Automation Computation and Control," by Grabbe et al., vol. 2 (John Wiley & Sons, 1959) at pages 14–42 et seq., with particular reference to Figure 44.

It will be readily appreciated that the analog control described for skew correction may be completely implemented by use of a digital computer system programmed to sense the magnitude and direction of movement of the image 360 across the line-finder 103*a* for selection and control of the transfer strut, such as strut 432 and for selective actuation of the polarity-responsive transfer strut 461 of FIGURE 10. In each case, the mechanical linkages to the transfer struts are of the character shown for movement of the strut 370, even though, except for the control for strut 370, they have all been shown in diagrammatic form.

It will now be understood that, in accordance with the invention, a drum is provided for holding and spinning the document in the direction of its line length. A reader at a read location includes a lens mounted for movement along a path parallel to the axis of the drum. A drive means is provided for advancing the drum and the lens past a reference location. Means synchronized with rotation of the drum are employed for stepping the lens in variable amounts in direction opposite the advance of the drum in dependence upon the spacing between the lines of the document. A feed-back loop including a translation drive for the drum is provided for varying the translation speed of the drum in response to departure of the lens from a reference location.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a system for optically scanning a written document one line at a time, the combination which comprises:
 (a) drum means for holding and spinning said document in the direction of the line length,
 (b) a reader including a lens movable along a path parallel to the axis of said drum,
 (c) means for advancing said drum means and said lens past a reference location, and
 (d) means for moving said lens stepwise in variable amounts in direction opposite the advance of said drum means in dependence upon the spacing between lines on said document, whereby said lens reciprocates relative to said drum means for sequentially scanning the lines on the document.

2. In a system for optically scanning a written document one line at a time, the combination which comprises:
 (a) drum means for holding and spinning said document in the direction of the line length,
 (b) a reader including a fixed retina and a lens unit movable along a path parallel to the axis of said drum,
 (c) drive means for moving said drum means in one direction past a reference location,
 (d) ratcheting means responsive to said drive means for moving said lens unit past said reference location in said direction, and
 (e) means for moving said lens unit stepwise in variable amounts in direction opposite the advance of said drum means in dependence upon the spacing between lines on said document, whereby said lens unit reciprocates relative to said drum means for sequentially scanning the lines on the document.

3. In a system for optically scanning a written document one line at a time, the combination which comprises:
 (a) a document receiving drum having rotatable drive means to spin said drum on its longitudinal axis,
 (b) a translational drive means to advance said drum in the direction of its axis,
 (c) a lens mounted adjacent to the surface of said drum and movable along a path parallel to said longitudinal axis,
 (d) a first lens drive extending from said translational drive normally to move said lens with said drum,
 (e) a second drive coupled to said lens to step said lens in direction opposite said advance of said drum in dependence upon the spacing between lines on said document, and
 (f) means for sensing the displacement of said lens from a reference position for modifying said translational drive to minimize the step required of said lens for registration with successive lines on said document, whereby said lens reciprocates relative to said drum means for sequentially scanning the lines on the document.

4. In a system for optically scanning a written document a line at a time, the combination which comprises:
 (a) a document receiving drum having rotatable drive means to spin said drum on its longitudinal axis,
 (b) a translational drive means to advance said drum in the direction of its axis,
 (c) a reader unit including a multi-cell light responsive detector, (d) a lens mounted adjacent to the surface of said drum and movable along a path parallel to said longitudinal axis for directing onto said cells constituent representations of a plurality of lines, (e) a first lens drive extending from said translational drive normally to move said lens with said drum, (f) a second drive coupled between said lens and said reader unit to step said lens in direction opposite the advance of said drum in dependence upon the spacing between said constituent representations on said detector, and (g) means for sensing the displacement of said lens from a mean position for modifying said translational drive to minimize the step required of said lens for registration with successive lines on said document, whereby said lens reciprocates relative to said drum means for sequentially scanning the lines on the document.

5. In a system for optically scanning a written document one line at a time, the combination which comprises:

(a) a document receiving and holding drum, (b) drive means engaging said drum for advancing said drum axially, (c) a lens unit including a lens holder, (d) resiliently biased support means mounting said holder adjacent to the surface of said drum for movement of said holder parallel to the axis of said drum and normally to bias said holder in the direction of advance of said drum, (e) a differential linkage extending between said drive means and said holder normally to translate said holder with said drum, (f) position sensing means for sensing movement of said holder away from a reference position, (g) means for stepping said holder in direction opposite the movement of said drum upon completion of scanning of one line on said document in dependence upon the distance between the scanned line and the next succeeding line upon said document, and (h) servo means responsive to said position sensing means for controlling said drive means to vary the advavnce of said drum, whereby said lens and drum means reciprocate relative to one another in order to sequentially scan the lines on the document.

6. In a system for optically scanning a written document one line at a time, the combination which comprises:

(a) drum means for holding and spinning said document in the direction of the line length, (b) means for advancing said drum means past a reference location, and (c) a reader including (i) a lens positioned adjacent to the surface of said drum for viewing the successive portions of said document as it moves a long while spinning on said axis, (ii) a fixed retina for sensing light patterns impressed thereon, (iii) means movable in synchronism with the spinning of said drum for projecting images from said drum onto said retina, and (iv) control means for gradually moving said moveable means in a first direction during travel of each line past said lens and for abruptly effecting opposite movement during tthe interval between the end of a line on said document and the begining of a succeeding line, whereby said lens reciprocates relative to said drum means for sequentially scanning the lines on the document.

7. In machine reading of a written document one line at a time by an optical viewer, the method which comprises:

(a) loading said document onto a cylindrical drum, (b) spinning said drum on its longitudinal axis to spin said document in the direction of the line length thereof, (c) advancing said drum and said optical viewer on paths parallel to the longitudinal axis of said drum, (d) sensing the presence or absence of information at locations on said document corresponding with a plurality of next succeeding normal line spacing locations, (e) moving said optical viewer stepwise along the path parallel to the axis of said drum in a direction opposite the advance of said drum in variable amounts dependent upon the spacing between lines on said document, and (f) unloading said document from said drum after the reading of the lines thereon.

8. The method of claim 7 wherein the rate of advance of said document and said drum is dependent upon the displacement of said optical viewer from a reference location.

9. The method of claim 7 and further comprising:

sensing the presence or absence of writing on said document at the second and third line locations, and moving said drum along its longitudinal axis in a direction normal to the line length at the end of the line being read in amounts dependent upon the presence or absence of writing at the next two succeeding line locations.

References Cited

UNITED STATES PATENTS 3,142,761 7/1964 Rabinow ------ 340—146.3 XR
3,221,302 11/1965 Silverberg ---- 335—61.115 XR MAYNARD R. WILBUR, *Primary Examiner.*

S. SHEINBEIN, *Assistant Examiner.*

U.S. Cl. X.R.

178—7.6; 340—146.3